S. J. NASON.
Harrow and Cultivator-Teeth.
No. 152,807. Patented July 7, 1874.
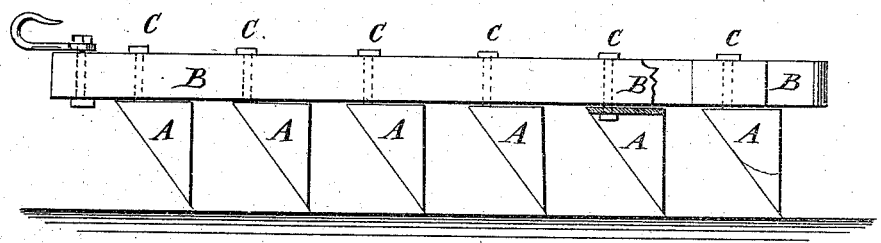
Fig. 1.
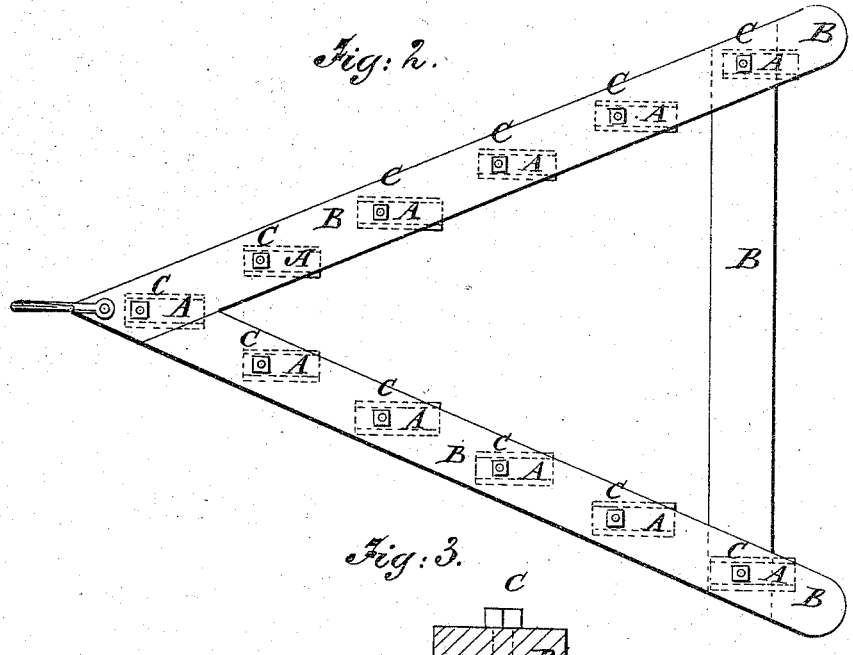
Fig. 2.
Fig. 3.
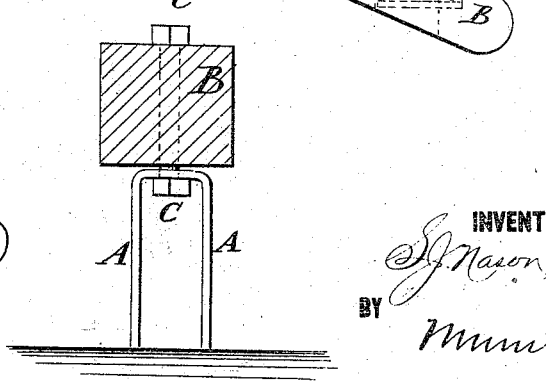
WITNESSES:
INVENTOR:

UNITED STATES PATENT OFFICE.

STEPHEN J. NASON, OF SOUTH BERWICK JUNCTION, MAINE.

IMPROVEMENT IN HARROW AND CULTIVATOR TEETH.

Specification forming part of Letters Patent No. 152,807, dated July 7, 1874; application filed March 28, 1874.

*To all whom it may concern:*

Be it known that I, STEPHEN J. NASON, of South Berwick Junction, York county, Maine, have invented a new and useful Improvement in Harrow and Cultivator Tooth, of which the following is a specification:

Figure 1 is a side view of a harrow to which my improved teeth have been applied, one of the teeth being shown in section. Fig. 2 is a top view of the same, and Fig. 3 is a detail view of one of the teeth.

Similar letters of reference indicate corresponding parts.

The invention consists in a double harrow-tooth inclined on the front edges, and pivoted so as to be self-adjusting and self-sharpening.

A are the teeth, which are made double, and the side or working parts of which are made in the shape of right-angled triangles, placed with their inclined sides forward. The side or triangular parts are parallel with each other, and are connected at their upper edges or bases by a plate, which is pivoted at its forward part to the harrow or cultivator frame B by a bolt, C, as shown in Figs. 1, 2, and 3.

The teeth A are designed to be made of steel, and with their forward or inclined edges sharp.

With this construction the teeth will always keep themselves sharp; will thoroughly cut in pieces and destroy weeds; will thoroughly pulverize soil and manure; will readily turn aside for and pass around small obstructions; and will pass over large obstructions.

Having thus described my invention, I claim as new and desire to secure by Letters Patent—

A pair of edge-inclined triangular teeth, A, connected at the top and pivoted in front on a bolt, C, as shown and described, whereby each pair becomes self-adjusting.

STEPHEN J. NASON.

Witnesses:
ABNER OAKES,
JOS. W. GOODWIN,
WM. P. GRAVES.